ized Patent

Schaefer et al.

(10) Patent No.: US 11,292,414 B2
(45) Date of Patent: Apr. 5, 2022

(54) AIRBAG PACKAGING WRAP

(71) Applicant: ZF Passive Safety Systems US Inc., Washington, MI (US)

(72) Inventors: Manuel Schaefer, Berlin, MI (US); Rico Scott Bertossi, Kenockee, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/922,041

(22) Filed: Jul. 7, 2020

(65) Prior Publication Data

US 2022/0009440 A1    Jan. 13, 2022

(51) Int. Cl.
*B60R 21/201*     (2011.01)
*B60R 21/237*     (2006.01)
*B60R 21/235*     (2006.01)
*B60R 21/013*     (2006.01)
*B60R 21/2342*    (2011.01)
*B60R 21/217*     (2011.01)

(52) U.S. Cl.
CPC .......... *B60R 21/201* (2013.01); *B60R 21/013* (2013.01); *B60R 21/217* (2013.01); *B60R 21/235* (2013.01); *B60R 21/237* (2013.01); *B60R 21/2342* (2013.01); *B60R 2021/2172* (2013.01); *B60R 2021/23509* (2013.01)

(58) Field of Classification Search
CPC ... B60R 21/201; B60R 21/013; B60R 21/237; B60R 21/235; B60R 21/2342; B60R 2021/23509
USPC ................................ 280/728.2, 730.2, 728.1
See application file for complete search history.

(56) References Cited

U.S. PATENT DOCUMENTS

2020/0101932 A1 *    4/2020    Ota ................... B60R 21/23138

* cited by examiner

*Primary Examiner* — Keith J Frisby
(74) *Attorney, Agent, or Firm* — Tarolli, Sundheim, Covell & Tummino LLP

(57) ABSTRACT

In one aspect, an apparatus for protecting an occupant of a vehicle includes an airbag having a stored condition in which the airbag is deflated, flattened, and rolled and/or folded. A packaging wrap is formed from a fabric sheet. The packaging wrap includes a cover and an elongated tail that extends from the cover. The cover is configured to be wrapped or folded about the rolled and/or folded airbag to envelope and package the airbag in the stored condition. The tail is configured to be wrapped around the cover and the airbag packaged therein to secure the airbag packaged in the cover.

24 Claims, 5 Drawing Sheets

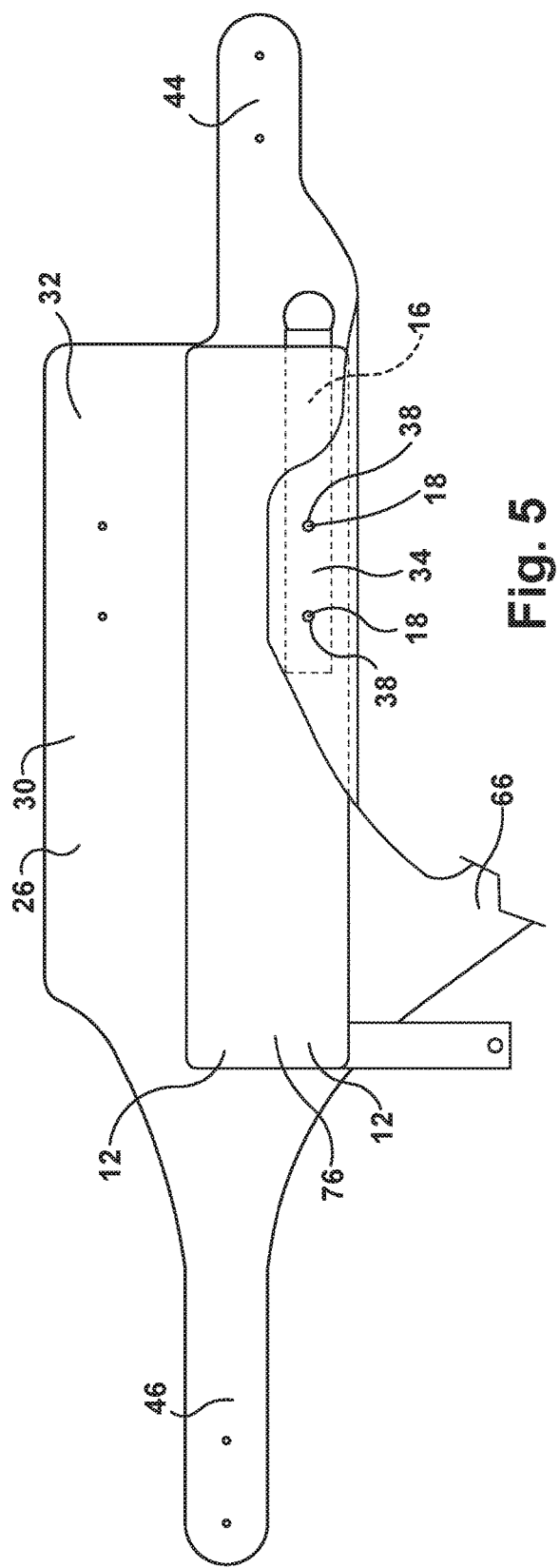
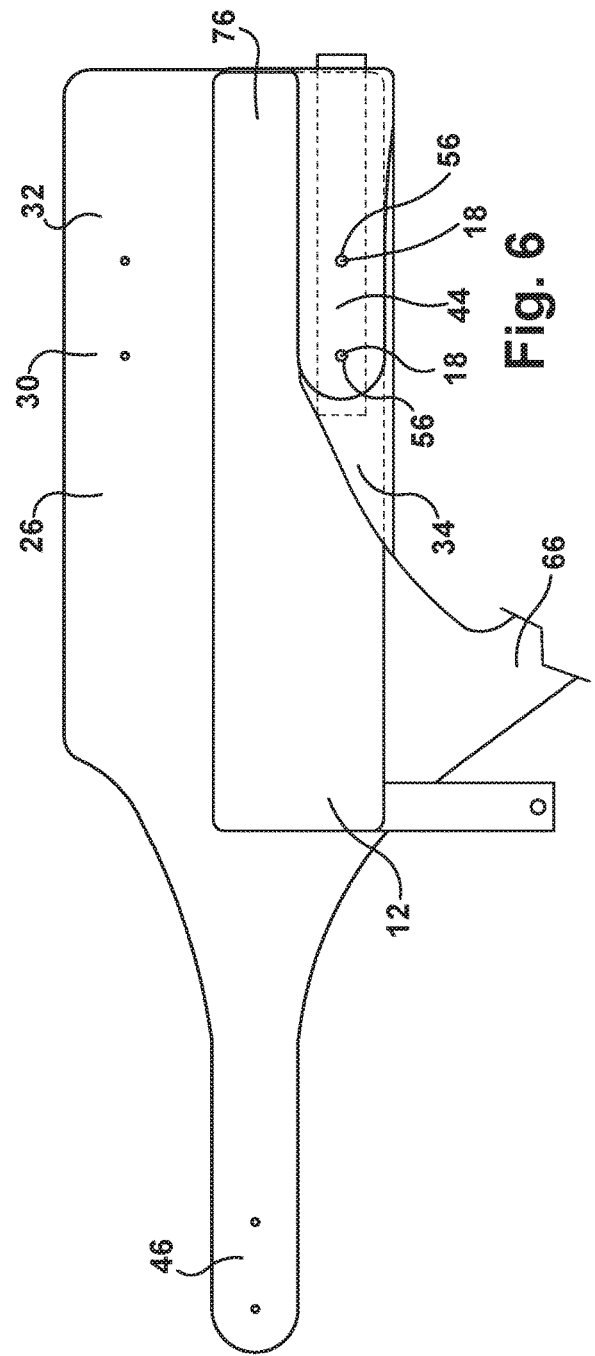

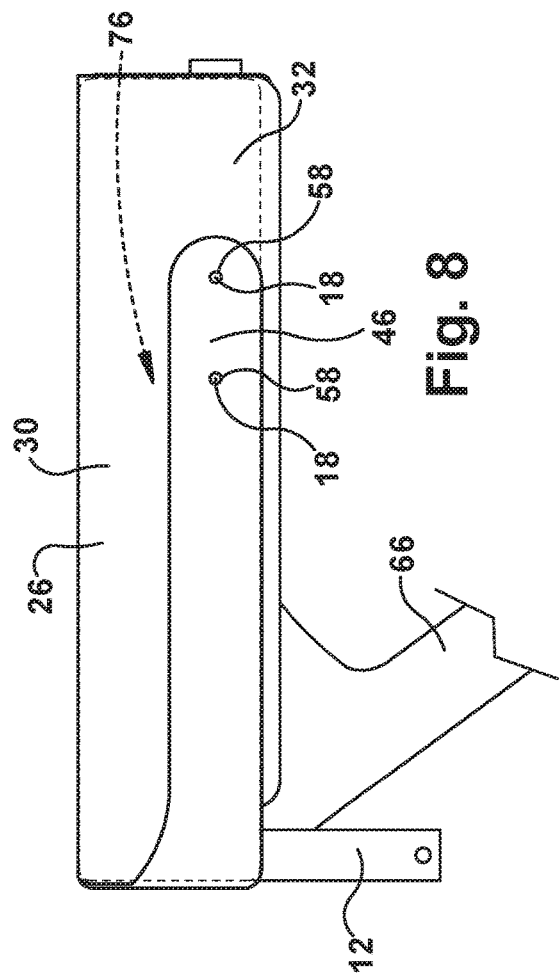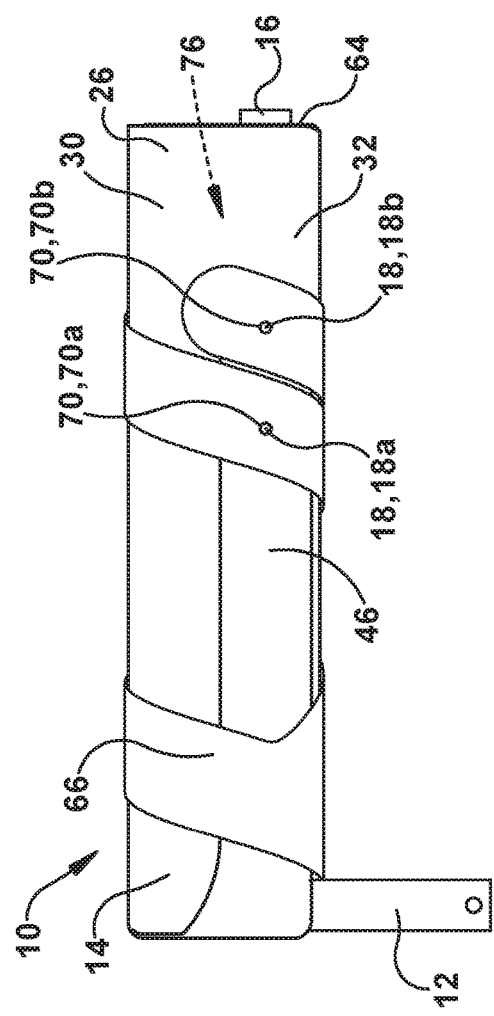

AIRBAG PACKAGING WRAP

FIELD OF THE INVENTION

The invention relates to an apparatus for helping to protect an occupant of a vehicle. More particularly, the invention relates to an airbag inflatable from a stored position and a packaging wrap for packaging the airbag.

BACKGROUND OF THE INVENTION

It is known to inflate an inflatable vehicle occupant protection device to help protect a vehicle occupant in the event of a vehicle collision. One particular type of inflatable vehicle occupant protection device is an airbag, such as a curtain airbag, a frontal airbag, a side airbag, an airbag for protecting rear-seated vehicle occupants, or a knee airbag. The airbag is fixed to a support structure of the vehicle and is configured to inflate from the vehicle support structure in the event of a collision or rollover. The airbag, when inflated, is positioned between a vehicle occupant and a structure of the vehicle.

Airbags can be rolled and/or folded into a packaged condition, ready for installation in the vehicle. The "packaged condition" refers to the airbag in its ready-to-install condition, regardless of whether it is rolled, folded, or a combination of rolled and folded. In the packaged condition, the airbag can also include additional features and/or structures, such as packaging sleeves and/or wraps, installation and/or fastening structures (fasteners, clamps, brackets, etc.), and inflation components, such as inflators, fill tubes, diffusers, etc.

Certain airbags utilize the packaging sleeves and/or wraps to package the airbag in the stored condition. Wraps are typically secured to the packaged airbag by tape that is cut to a desired length. Acquiring and/or cutting the tape adds additional costs and steps to the packaging process. Sleeves are sized to receive the rolled/folded airbag, but achieving a tightly packaged airbag with a sleeve is difficult because the sleeve needs to slide over the entire length of the rolled/folded airbag. In achieving a tight fit, the roll/fold can become distorted, which can negatively affect deployment. Additionally, the airbag and/or the sleeve can become twisted, which can further negatively affect deployment.

SUMMARY OF THE INVENTION

According to one aspect, an apparatus for protecting an occupant of a vehicle comprising an airbag having a stored condition in which the airbag is deflated, flattened, and rolled and/or folded. A packaging wrap is formed from a fabric sheet and comprises a cover and an elongated tail that extends from the cover. The cover is configured to be wrapped or folded about the rolled and/or folded airbag to envelope and package the airbag in the stored condition. The tail is configured to be wrapped around the cover and the airbag packaged therein to secure the airbag packaged in the cover.

According to another aspect, alone or in combination with any other aspect, the apparatus can further comprise an inflator operatively connected to the airbag. The cover can be configured to be wrapped or folded about the inflator and the rolled and/or folded airbag to package the airbag with the inflator. The tail can be configured to be wrapped around the inflator, the airbag, and the cover to form a packaged airbag module.

According to another aspect, alone or in combination with any other aspect, the inflator can have at least one fastening stud for mounting the inflator to the vehicle. The tail can be configured to be attached to the at least one fastening stud to maintain the packaged condition of the airbag module.

According to another aspect, alone or in combination with any other aspect, the cover can comprise longitudinally extending upper and lower edge portions configured to be folded or wrapped about the rolled and/or folded airbag, and end portions at opposite ends of the upper and lower edge portions configured to be folded onto the rolled and/or folded airbag.

According to another aspect, alone or in combination with any other aspect, each of the upper and lower edge portions and end portions of the cover can comprise one or more openings for attaching the upper and lower edge portions and the end portions to at least one fastening stud of the inflator to secure the airbag module in the packaged condition.

According to another aspect, alone or in combination with any other aspect, the tail can comprise one or more openings for attaching the tail to the at least one fastening stud to maintain the packaged condition of the airbag module.

According to another aspect, alone or in combination with any other aspect, a vehicle safety system can comprise the airbag module, one or more sensors for sensing the occurrence of an event for which inflation of the airbag is desired, and a controller configured to activate the inflator to inflate the airbag in response to indications from the one or more sensors.

According to another aspect, alone or in combination with any other aspect, the tail can be configured to be wrapped around the cover and the airbag packaged therein more than once to secure the airbag packaged in the cover.

According to another aspect, alone or in combination with any other aspect, the tail can be configured to be wrapped helically around the airbag packaged in the cover.

According to another aspect, alone or in combination with any other aspect, the inflator can have first and second fastening studs for mounting the inflator to the vehicle. The tail can comprise first and second openings configured so that the first opening can receive the first fastening stud on one helical wrap, and the second opening can receive the second fastening stud on a subsequent helical wrap.

According to another aspect, alone or in combination with any other aspect, the tail can extend at an angle from the cover to facilitate the helical wrapping without folding the tail.

According to another aspect, alone or in combination with any other aspect, a portion of the tail can be configured to tear or rupture in response to inflation of the airbag to permit deployment of the airbag from the stored condition.

According to another aspect, alone or in combination with any other aspect, a method for packaging an airbag can comprise deflating, flattening, and rolling and/or folding an airbag to place the airbag in a stored condition. The packaging wrap can be provided. The cover can be wrapped or folded about the rolled and/or folded airbag to envelope and package the airbag in the cover. The tail can be wrapped around the cover and the airbag packaged therein to secure the airbag packaged in the cover.

According to another aspect, alone or in combination with any other aspect, the cover can comprise longitudinally extending upper and lower edge portions and end portions at opposite ends of the upper and lower edge portions. Wrapping or folding the cover about the rolled and/or folded airbag can comprise folding or wrapping the upper and lower edge portions about the rolled and/or folded airbag, and folding the end portions onto the rolled and/or folded airbag.

According to another aspect, alone or in combination with any other aspect, the method can further comprise providing an inflator operatively connected to the airbag. The cover can be wrapped about the inflator and the rolled and/or folded airbag to package the airbag with the inflator. The tail can be wrapped around the inflator, the airbag, and the cover to form a packaged airbag module.

According to another aspect, alone or in combination with any other aspect, the inflator can have at least one fastening stud for mounting the inflator to a vehicle. The method can further comprise attaching the tail to the at least one fastening stud to maintain the packaged condition of the airbag module.

According to another aspect, alone or in combination with any other aspect, the inflator can have first and second fastening studs for mounting the inflator to the vehicle. The tail can comprise first and second openings. Wrapping the tail around the inflator, the airbag, and the cover to form a packaged airbag module can comprise wrapping the tail helically around the inflator, the airbag, and the cover. Attaching the tail to the at least one fastening stud to maintain the packaged condition of the airbag module can comprise receiving the first fastening stud in the first opening on a first helical wrap of the tail round the inflator, the airbag, and the cover. Attaching the tail to the at least one fastening stud to maintain the packaged condition of the airbag module can also comprise receiving the second fastening stud in the second opening on a subsequent helical wrap of the tail round the inflator, the airbag, and the cover.

According to another aspect, alone or in combination with any other aspect, the cover can comprise longitudinally extending upper and lower edge portions and first and second end portions at opposite ends of the upper and lower edge portions. Wrapping or folding the cover about the rolled and/or folded airbag can comprise folding or wrapping the lower edge portion about the rolled and/or folded airbag. After folding or wrapping the lower edge portion about the rolled and/or folded airbag, the lower edge portion can be attached to the at least one fastening stud. The first end portion can be folded onto the rolled and/or folded airbag. After folding first end portion onto the rolled and/or folded airbag, the first end portion can be attached to the at least one fastening stud. The upper edge portion can be folded or wrapped about the rolled and/or folded airbag. After folding or wrapping the upper edge portion about the rolled and/or folded airbag, the upper edge portion can be attached to the at least one fastening stud. The second end portion can be folded onto the rolled and/or folded airbag. After folding second end portion onto the rolled and/or folded airbag, the second end portion can be attached to the at least one fastening stud.

According to another aspect, alone or in combination with any other aspect, wrapping the tail around the cover and the airbag packaged therein can comprise wrapping the tail around the cover and the airbag packaged therein more than once to secure the airbag packaged in the cover.

According to another aspect, alone or in combination with any other aspect, wrapping the tail around the cover and the airbag packaged therein can comprise helically wrapping the tail around the cover and the airbag packaged therein.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIGS. 4-9 illustrate a method for packaging the apparatus of FIG. 1.

DETAILED DESCRIPTION OF THE INVENTION

Figure 1:
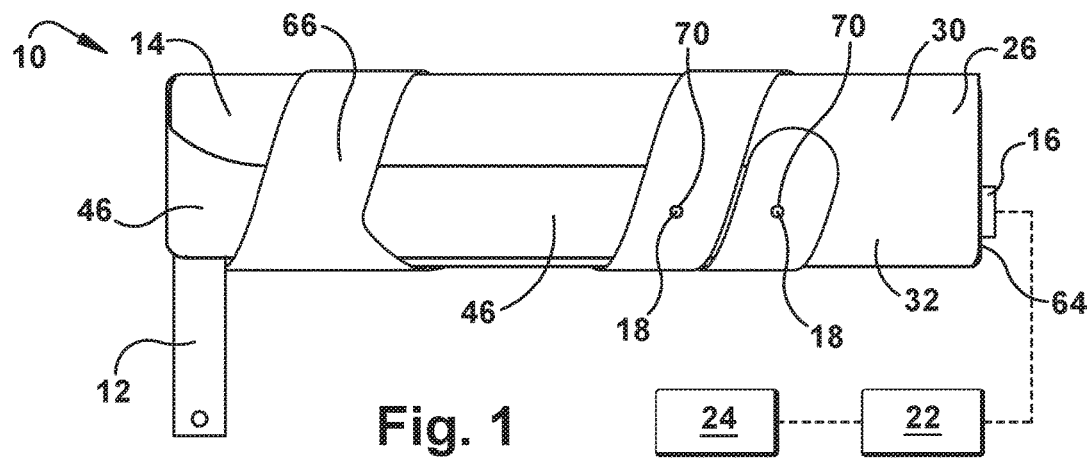
FIG. 1 is a schematic view illustrating an apparatus for helping to protect an occupant of a vehicle, including the apparatus in a packaged condition.
Figure 4:
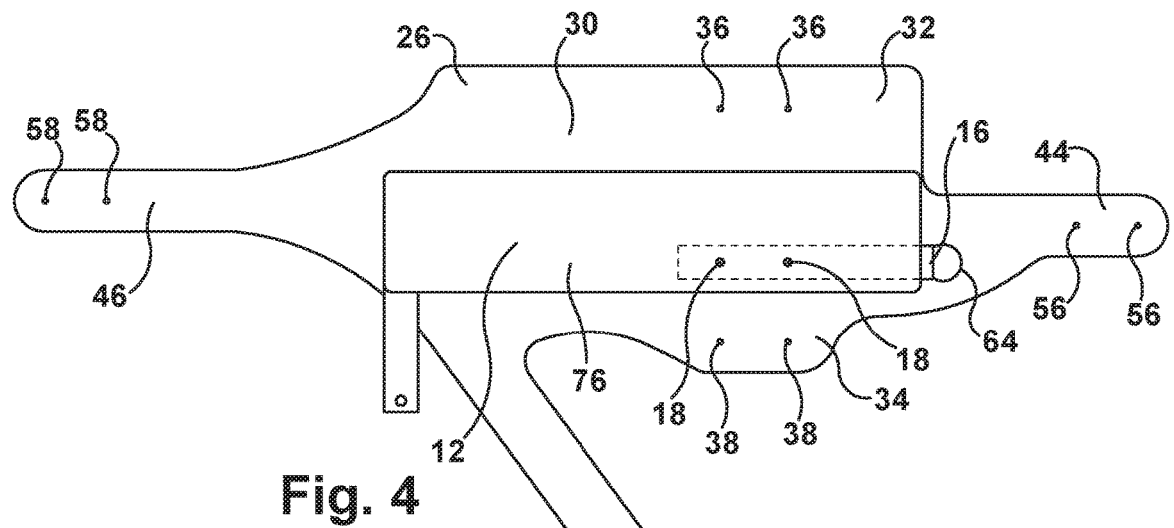

As shown in FIGS. 1 and 4, an apparatus 10 for helping to protect an occupant of a vehicle includes an inflatable vehicle occupant protection device 12 in the form of an airbag for helping to protect the vehicle occupant. Although the airbag 12 shown in the Figures is a curtain airbag, the airbag can be any other type of airbag, such as a frontal airbag, a side airbag, an airbag for protecting rear-seated vehicle occupants, or a knee airbag.

The airbag 12 can be constructed of any suitable material, such as nylon (e.g., woven nylon 6-6 yarns), and can be constructed in any suitable manner. For example, the airbag 12 may have a one-piece woven (OPW) construction in which the airbag is woven as a single piece of material. As another example, the airbag 12 can include more than one piece of material. If more than one piece is used, the pieces can be interconnected by known means, such as stitching, ultrasonic welding, heat bonding, or adhesives, to form the airbag 12.

The airbag 12 can be uncoated, coated with a material, such as a gas impermeable urethane, or laminated with a material, such as a gas impermeable film. The airbag 12 thus can have a gas-tight or substantially gas-tight construction. Those skilled in the art will appreciate that alternative materials, such as polyester yarn, and alternatives coatings, such as silicone, can also be used to construct the airbag 12.

As shown in FIG. 1, the airbag 12 can be a part of an airbag module 14 that also includes an inflator 16 operatively connected to the airbag. The inflator 16 is actuatable to provide inflation fluid for inflating the airbag 12 from a stored condition to a deployed condition. The inflator 16 has fastening studs 18 for mounting the inflator to the vehicle. The inflator 16 can be of any known type, such as stored gas, solid propellant, augmented, or hybrid. A controller 22 can be operatively connected to the inflator 16. The controller 22 can be operatively connected to one or more sensors 24 that sense the occurrence of an event for which inflation of the airbag 12 is desired, such as a collision. The controller 22 actuates the inflator 16 in response to indications from the one or more sensors 24.

The airbag module 14 can be mounted to a support structure of the vehicle in any desired manner. The support structure can be any structure in the vehicle that will accommodate the airbag 12 being deployed therefrom so that the deployed airbag is positioned between a vehicle structure and a vehicle occupant. For example, the support structure can be a roof rail of the vehicle so that the deployed airbag 12 is positioned between a side structure of the vehicle (e.g., a vehicle door, side window, roof rail, vehicle pillar) and a vehicle occupant.

To form the airbag module 14, the airbag 12 is first deflated and flattened. The deflated and flattened airbag 12 is then rolled and/or folded into the stored condition. This can be done, for example, by rolling a lower edge of the airbag upward toward an upper edge. The inflator 16 can be operatively connected to the airbag 12 prior to or after the airbag is rolled and/or folded into the stored condition.

Once the airbag 12 is in the stored condition and the inflator 16 is operatively connected thereto, the airbag module 14 can be packaged. By "package" or "packaged," it is meant that the airbag 12 is maintained in the stored condition along with the inflator 16 so that the airbag and the inflator can be installed in the vehicle as a unit. Thus, reference herein to "packaging the airbag" and the like means placing the airbag 12 into a condition in which the airbag is maintained in the stored condition along with the inflator 16 in a ready-to-install condition. In the present case, the packaged airbag 12 and inflator 16 form the airbag module 14.

Some airbag modules utilize wrapping structures, such as packaging sleeves and/or wraps, to package the airbag. Wraps are typically secured to the airbag and the inflator by tape that is cut to a desired length. Acquiring and/or cutting the tape adds additional costs and steps to the packaging process. Sleeves are sized to receive the rolled/folded airbag, but achieving a tightly packaged airbag with a sleeve is difficult because the sleeve needs to slide over the entire length of the rolled/folded airbag. In achieving a tight fit, the roll/fold can become distorted, which can negatively affect deployment. Additionally, the airbag and/or the sleeve can become twisted, which can further negatively affect deployment.

Figure 2:
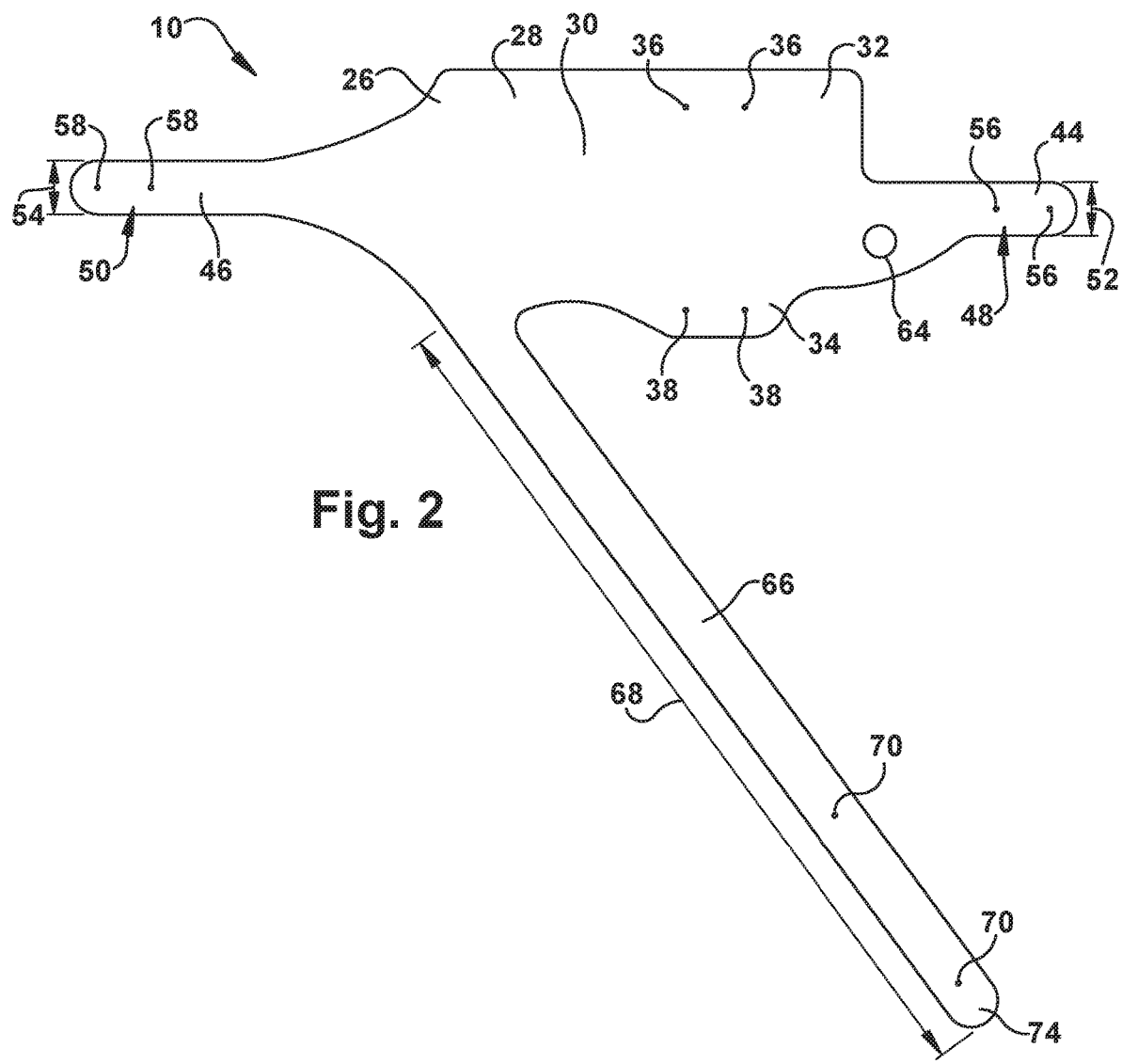
FIG. 2 is a side view of an element of the apparatus of FIG. 1.

As shown in FIGS. 1-2, the apparatus 10 includes a packaging wrap 26 that is designed to help reduce the costs, additional steps, and problems associated with using sleeves, wraps, and tape to package the airbag. The packaging wrap 26 is formed from a single fabric sheet 28. The fabric sheet 28 can be made from the same material used to construct the airbag 12, or from other materials.

The packaging wrap 26 comprises a cover 30. As shown in FIG. 2, the cover 30 comprises longitudinally extending upper and lower edge portions 32, 34. The upper and lower edge portions 32, 34 each include apertures 36, 38 extending therethrough. The apertures 36, 38 can be driven over the fastening studs 18 to attach the upper and lower edge portions 32, 34 to the fastening studs. To accommodate this attachment, the diameters of the apertures 36, 38 can be about equal to or greater than the diameters of the fastening studs 18. Alternatively, the diameters of the apertures 36, 38 can be less than the diameters of the fastening studs 18. In this configuration, the apertures 36, 38 are still able to be driven over the fastening studs 18 because of the flexible nature of the fabric sheet 28 that forms the packaging wrap 26.

First and second end portions 44, 46 of the cover 30 are at opposite ends 48, 50 of the upper and lower edge portions 32, 34. As shown in FIG. 2, widths 52, 54 of the first and second end portions 44, 46 can gradually diminish into a strap-like configuration to permit manipulation of the first and second end portions relative to the remainder of the cover 30. The first and second end portions 44, 46 each include apertures 56, 58 extending therethrough. The apertures 56, 58 can have a similar construction and function as the apertures 36, 38 of the upper and lower edge portions 32, 34. The first end portion 44 can also include an inflator aperture 64. As shown in FIG. 1, a portion of the inflator 16 can extend through the inflator aperture 64 when the airbag module 14 is packaged. Alternatively, an inflator ignitor (not shown) operatively connected to the inflator 16 can extend through the inflator aperture 64.

As shown in FIGS. 1-2, the packaging wrap 26 also includes a tail 66. The tail 66 has a sufficient length 68 to be wrapped (e.g., helically wrapped) around the airbag module 14 (i.e., the cover 30, the inflator 16, and the airbag 12) at least once. A tail 66, however, that is wrapped around the airbag module 14 more than once may more securely maintain the packaged condition of the airbag module than a tail that is wrapped around the airbag module only once. The length 68 of the tail 66 can be selected based on the size of the airbag module 14, the softness of the airbag module, and/or the number of times that is desired for the tail to be wrapped around the airbag module. The tail 66 includes apertures 70 extending therethrough. The apertures 70 can have a similar construction and function as the apertures 36, 38 of the upper and lower edge portions 32, 34.

Figure 3:
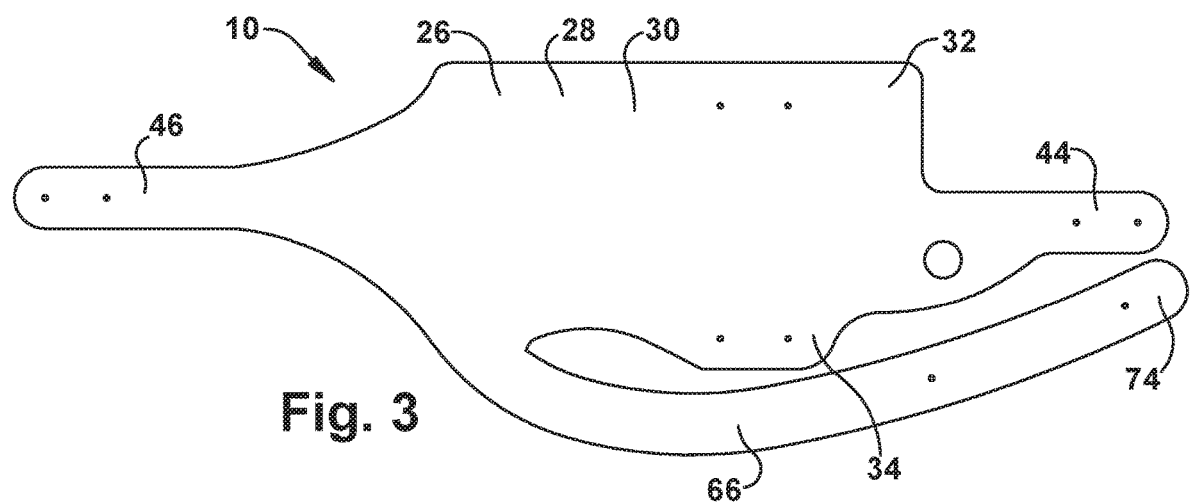
FIG. 3 is a side view of the element of FIG. 2 in an alternative configuration.

As shown in FIG. 2, the packaging wrap 26 can be configured so that the tail 66 extends away from the lower edge portion 34 at an acute angle with a free end portion 74 of the tail being substantially spaced from the cover 30. The angular extension of the tail 66 from the cover 30 can facilitate helical wrapping of the tail about the airbag module 14 without folding the tail (see FIG. 1). Alternatively, as shown in FIG. 3, the packaging wrap 26 can be configured so that the tail 66 curls about the lower edge portion 34 with the free end portion 74 of the tail being adjacent to the cover 30. The curled configuration of the tail 66 in FIG. 3 may provide a smaller footprint and a more optimized nesting configuration for mass producing the packaging wrap 26. The curled configuration of the tail 66 may also facilitate helical wrapping of the tail about the airbag module 14 without folding the tail.

It should be appreciated that the tail 66 can be configured in any desired manner to help provide a desired nesting configuration for the packaging wrap 26, while still providing a desired tail length 68. Furthermore, although the tail 66 is shown as extending from the lower edge portion 34 of the cover 30, the tail can be configured to extend from the any other portion of the cover, such as the upper edge portion 32.

FIGS. 4-9 illustrate an example process by which the airbag module 14 can be packaged. This example process is not intended to limit the manner in which the airbag module 14 is packaged. It should be appreciated that certain steps of the below example process can be performed before and/or after certain other steps of the process whether expressly stated, shown, or not. An airbag 12 is first placed into the stored condition by deflating, flattening, and rolling and/or folding the airbag. An inflator 16 is operatively connected to the stored airbag 12 to form an airbag-inflator unit 76. The inflator 16 can be connected to the stored airbag before or after the airbag is placed in the stored condition. As shown in FIG. 4, the fastening studs 18 of the inflator 16 can extend through a portion of the stored airbag 12.

As shown in FIG. 4, the airbag-inflator unit 76 is placed on the flatly spread cover 30 of a packaging wrap 26. As shown in FIG. 5, the lower edge portion 34 is folded/wrapped about the airbag-inflator unit 76. The apertures 38 of the lower edge portion 34 are then driven over the fastening studs 18 to attach the lower edge portion to the fastening studs and secure the lower edge portion to the airbag-inflator unit 76. As shown in FIG. 6, the first end portion 44 is folded onto the airbag-inflator unit 76. The first end portion 44 is then attached to the fastening studs 18 and secured to the airbag-inflator unit 76 by the apertures 56. In the example configuration of FIG. 6, at least a portion of the inflator 16 can be inserted through the inflator aperture 64 while or after the first end portion 44 is folded.

Figure 7:
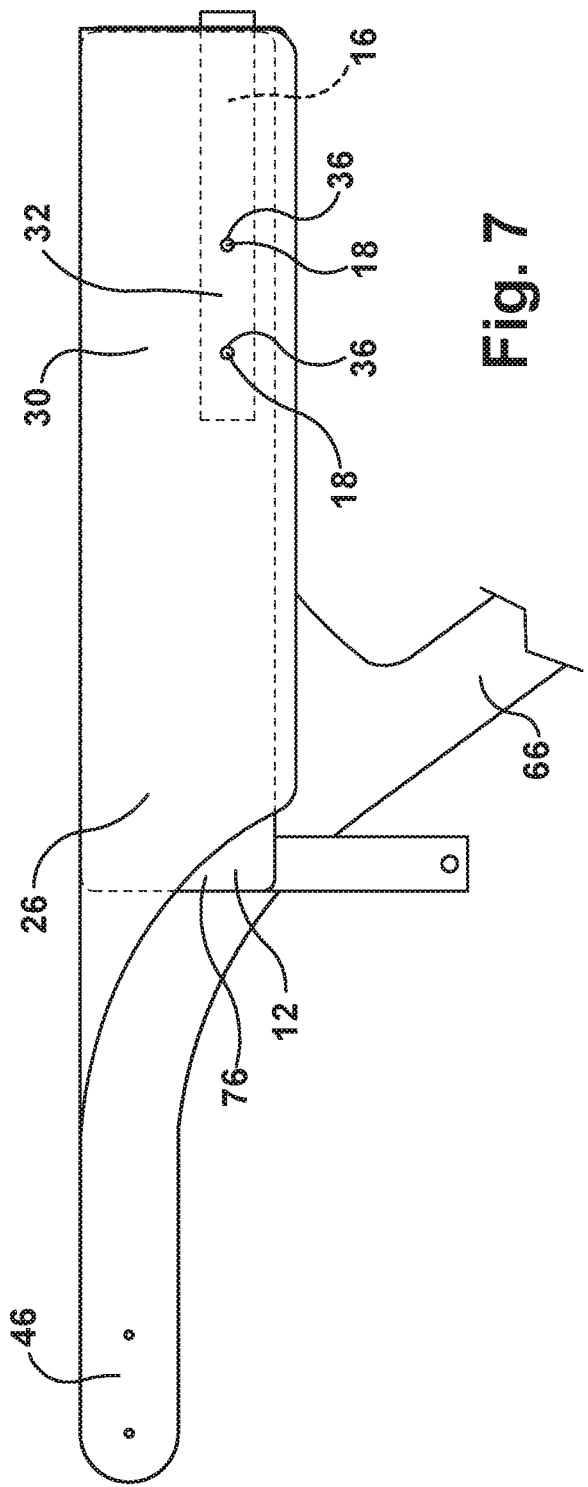

As shown in FIG. 7, after the first end portion 44 is secured to the airbag-inflator unit 76, the upper edge portion 32 is folded/wrapped about the airbag-inflator unit. The upper edge portion 32 is then attached to the fastening studs 18 and secured to the airbag-inflator unit 76 by the apertures 36. As shown in FIG. 8, the second end portion 46 is folded onto the airbag-inflator unit 76. The second end portion 46 is then attached to the fastening studs 18 and secured to the airbag-inflator unit 76 by the apertures 58.

Once the upper and lower edge portions 32, 34 and the first and second end portions 44, 46 are folded/wrapped about or on the airbag-inflator unit 76, the stored airbag 12 is in a condition in which the airbag is enveloped and packaged in the cover 30 with the inflator 16. The upper and lower edge portions 32, 34 and the first and second end portions 44, 46 being attached to the fastening studs 18 helps to secure the airbag-inflator unit 76 packaged in the cover 30.

As shown in FIG. 9, the tail 66 is then wrapped about the cover 30, and the airbag 12 and inflator 16 packaged therein, to form a packaged airbag module 14. The apertures 70 of the tail 66 can be driven over the fastening studs 18 while or after the tail is wrapped about the airbag module 14. In the example configuration of FIG. 9, a first aperture 70a is driven over a first fastening stud 18a while the tail 66 is being wrapped around the airbag module 14 for a second time. A second aperture 70b is driven over a second fastening stud 18b while the tail 66 is being wrapped around the airbag module 14 for a third time. The tail 66, being wrapped around the airbag module 14 and attached to the fastening studs 18, maintains the packaged condition of the airbag module and secures the stored airbag 12 packaged in the cover 30. The upper and lower edge portions 32, 34 and the first and second end portions 44, 46 being attached to the fastening studs 18 can also help secure the airbag module 14 in the packaged condition.

The packaged airbag module 14 can then be installed in a vehicle or stored prior to installation in a vehicle. Once installed in a vehicle, the wrapped tail 66 maintains the packaged condition of the airbag 12 until deployment. To facilitate the deployment, the tail 66 can be configured with at least one tear seam or rupturable portion that tears/ruptures in response to the deployment of the airbag 12. The materials forming fabric sheet 28 can also be chosen so that the deployment forces of the inflating airbag 12 cause the tail 66, and also the cover 30 when desired, to tear and permit the airbag to deploy.

Advantageously, because the tail 66 is an integral portion of the packaging wrap 26 and maintains the airbag module 14 in the packaged condition, the use of tape to package the airbag module is reduced or eliminated. Furthermore, by forming the tail 66 and the cover 30 in the same nest of material, the costs associated with acquiring additional resources, such as tape, to package the airbag module 14 is reduced or eliminated. Additionally, the tail 66 is designed having a desired length 68. Thus, the step of cutting tape to a desired length is eliminated from the packaging process.

The tail 66 can also help achieve a tightly packed airbag 12 because, unlike a sleeve, the tail is not slid over the entire length of the rolled/folded airbag. The tail 66 thus helps reduce the risk of distortions or twists occurring in the rolled/folded airbag 12 during the packaging process.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for protecting an occupant of a vehicle, comprising:
   an airbag having a stored condition in which the airbag is deflated, flattened, and rolled and/or folded; and
   a packaging wrap formed from a fabric sheet and comprising a cover and an elongated tail that extends from the cover, wherein the cover is configured to be wrapped or folded about the rolled and/or folded airbag to envelope and package the airbag in the stored condition, the tail being configured to be wrapped around the cover and the airbag packaged therein to secure the airbag packaged in the cover, wherein the tail is configured to be wrapped around the cover and the airbag packaged therein more than once to secure the airbag packaged in the cover.

2. The apparatus recited in claim 1, further comprising an inflator operatively connected to the airbag, wherein the cover is configured to be wrapped or folded about the inflator and the rolled and/or folded airbag to package the airbag with the inflator, and wherein the tail is configured to be wrapped around the inflator, the airbag, and the cover to form a packaged airbag module.

3. The apparatus recited in claim 2, wherein the inflator has at least one fastening stud for mounting the inflator to the vehicle, and wherein the tail is configured to be attached to the at least one fastening stud to maintain the packaged condition of the airbag module.

4. The apparatus recited in claim 2, wherein the cover comprises longitudinally extending upper and lower edge portions configured to be folded or wrapped about the rolled and/or folded airbag, and end portions at opposite ends of the upper and lower edge portions configured to be folded onto the rolled and/or folded airbag.

5. The apparatus recited in claim 4, wherein each of the upper and lower edge portions and end portions of the cover comprise one or more openings for attaching the upper and lower edge portions and the end portions to at least one fastening stud of the inflator to secure the airbag module in the packaged condition.

6. The apparatus recited in claim 5, wherein the tail comprises one or more openings for attaching the tail to the at least one fastening stud to maintain the packaged condition of the airbag module.

7. A vehicle safety system comprising the airbag module of claim 2, one or more sensors for sensing the occurrence of an event for which inflation of the airbag is desired, and a controller configured to activate the inflator to inflate the airbag in response to indications from the one or more sensors.

8. The apparatus recited in claim 2, wherein the tail is configured to be wrapped helically around the airbag packaged in the cover.

9. The apparatus recited in claim 8, wherein the inflator has first and second fastening studs for mounting the inflator to the vehicle, and wherein the tail comprises first and second openings configured so that the first opening receives the first fastening stud on one helical wrap, and the second opening receives the second fastening stud on a subsequent helical wrap.

10. The apparatus recited in claim 8, wherein the tail extends at an angle from the cover to facilitate the helical wrapping without folding the tail.

11. The apparatus recited in claim 1, wherein a portion of the tail is configured to tear or rupture in response to inflation of the airbag to permit deployment of the airbag from the stored condition.

12. A method for packaging an airbag, the method comprising:
deflating, flattening, and rolling and/or folding an airbag to place the airbag in a stored condition;
providing a packaging wrap formed from a fabric sheet and comprising a cover and an elongated tail that extends from the cover, wherein the cover is configured to be wrapped or folded about the rolled and/or folded airbag to envelope and package the airbag in the stored condition, the tail being configured to be wrapped around the cover and the airbag packaged therein to secure the airbag packaged in the cover;
wrapping or folding the cover about the rolled and/or folded airbag to envelope and package the airbag in the cover; and
wrapping the tail around the cover and the airbag packaged therein more than once to secure the airbag packaged in the cover.

13. The method recited in claim 12, wherein the cover comprises longitudinally extending upper and lower edge portions and end portions at opposite ends of the upper and lower edge portions, and wherein wrapping or folding the cover about the rolled and/or folded airbag comprises:
folding or wrapping the upper and lower edge portions about the rolled and/or folded airbag; and
folding the end portions onto the rolled and/or folded airbag.

14. The method recited in claim 12, further comprising:
providing an inflator operatively connected to the airbag;
wrapping the cover about the inflator and the rolled and/or folded airbag to package the airbag with the inflator; and
wrapping the tail around the inflator, the airbag, and the cover to form a packaged airbag module.

15. The method recited in claim 14, wherein the inflator has at least one fastening stud for mounting the inflator to a vehicle, the method further comprising:
attaching the tail to the at least one fastening stud to maintain the packaged condition of the airbag module.

16. The method recited in claim 15, wherein the inflator has first and second fastening studs for mounting the inflator to the vehicle, and the tail comprises first and second openings, wherein wrapping the tail around the inflator, the airbag, and the cover to form a packaged airbag module comprises wrapping the tail helically around the inflator, the airbag, and the cover, and wherein attaching the tail to the at least one fastening stud to maintain the packaged condition of the airbag module comprises:
receiving the first fastening stud in the first opening on a first helical wrap of the tail round the inflator, the airbag, and the cover; and
receiving the second fastening stud in the second opening on a subsequent helical wrap of the tail round the inflator, the airbag, and the cover.

17. The method recited in claim 15, wherein the cover comprises longitudinally extending upper and lower edge portions and first and second end portions at opposite ends of the upper and lower edge portions, and wherein wrapping or folding the cover about the rolled and/or folded airbag comprises:
folding or wrapping the lower edge portion about the rolled and/or folded airbag;
after folding or wrapping the lower edge portion about the rolled and/or folded airbag, attaching the lower edge portion to the at least one fastening stud;
folding the first end portion onto the rolled and/or folded airbag;
after folding the first end portion onto the rolled and/or folded airbag, attaching the first end portion to the at least one fastening stud;
folding or wrapping the upper edge portion about the rolled and/or folded airbag;
after folding or wrapping the upper edge portion about the rolled and/or folded airbag, attaching the upper edge portion to the at least one fastening stud;
folding the second end portion onto the rolled and/or folded airbag; and
after folding the second end portion onto the rolled and/or folded airbag, attaching the second end portion to the at least one fastening stud.

18. The method recited in claim 12, wherein wrapping the tail around the cover and the airbag packaged therein comprises helically wrapping the tail around the cover and the airbag packaged therein.

19. An apparatus for protecting an occupant of a vehicle, comprising:
an airbag having a stored condition in which the airbag is deflated, flattened, and rolled and/or folded;
an inflator operatively connected to the airbag; and
a packaging wrap formed from a fabric sheet and comprising a cover and an elongated tail that extends from the cover;
wherein the cover is configured to be wrapped or folded about the rolled and/or folded airbag to envelope and package the airbag in the stored condition, the tail being configured to be wrapped around the cover and the airbag packaged therein to secure the airbag packaged in the cover,
wherein the cover is configured to be wrapped or folded about the inflator and the rolled and/or folded airbag to package the airbag with the inflator,
wherein the tail is configured to be wrapped around the inflator, the airbag, and the cover to form a packaged airbag module,
wherein the cover comprises longitudinally extending upper and lower edge portions configured to be folded or wrapped about the rolled and/or folded airbag, and end portions at opposite ends of the upper and lower edge portions configured to be folded onto the rolled and/or folded airbag.

20. The apparatus recited in claim 19, wherein the tail is configured to be wrapped around the cover and the airbag packaged therein more than once to secure the airbag packaged in the cover.

21. An apparatus for protecting an occupant of a vehicle, comprising:
an airbag having a stored condition in which the airbag is deflated, flattened, and rolled and/or folded; and
an inflator operatively connected to the airbag; and
a packaging wrap formed from a fabric sheet and comprising a cover and an elongated tail that extends from the cover, wherein the cover is configured to be wrapped or folded about the rolled and/or folded airbag to envelope and package the airbag in the stored condition, the tail being configured to be wrapped around the cover and the airbag packaged therein to secure the airbag packaged in the cover,
wherein the tail is configured to be wrapped helically around the airbag packaged in the cover, wherein the inflator has first and second fastening studs for mounting the inflator to the vehicle, and wherein the tail comprises first and second openings configured so that the first opening receives the first fastening stud on one helical wrap, and the second opening receives the second fastening stud on a subsequent helical wrap.

22. A method for packaging an airbag, the method comprising:
deflating, flattening, and rolling and/or folding an airbag to place the airbag in a stored condition;
providing a packaging wrap formed from a fabric sheet and comprising a cover and an elongated tail that extends from the cover, wherein the cover is configured to be wrapped or folded about the rolled and/or folded airbag to envelope and package the airbag in the stored condition, the tail being configured to be wrapped around the cover and the airbag packaged therein to secure the airbag packaged in the cover;
wrapping or folding the cover about the rolled and/or folded airbag to envelope and package the airbag in the cover; and
wrapping the tail around the cover and the airbag packaged therein to secure the airbag packaged in the cover,
wherein the cover comprises longitudinally extending upper and lower edge portions and end portions at opposite ends of the upper and lower edge portions, and wherein wrapping or folding the cover about the rolled and/or folded airbag comprises:
folding or wrapping the upper and lower edge portions about the rolled and/or folded airbag; and
folding the end portions onto the rolled and/or folded airbag.

23. A method for packaging an airbag, the method comprising:
deflating, flattening, and rolling and/or folding an airbag to place the airbag in a stored condition;
providing a packaging wrap formed from a fabric sheet and comprising a cover and an elongated tail that extends from the cover, wherein the cover is configured to be wrapped or folded about the rolled and/or folded airbag to envelope and package the airbag in the stored condition, the tail being configured to be wrapped around the cover and the airbag packaged therein to secure the airbag packaged in the cover;
providing an inflator operatively connected to the airbag;
wrapping or folding the cover about the rolled and/or folded airbag and the inflator to envelope and package the airbag and inflator in the cover; and
wrapping the tail around the inflator, the cover, and the airbag packaged therein to secure the airbag packaged in the cover and to form a packaged airbag module,
wherein the inflator has at least one fastening stud for mounting the inflator to a vehicle, the method further comprising attaching the tail to the at least one fastening stud to maintain the packaged condition of the airbag module, and
wherein the inflator has first and second fastening studs for mounting the inflator to the vehicle, and the tail comprises first and second openings, wherein wrapping the tail around the inflator, the airbag, and the cover to form a packaged airbag module comprises wrapping the tail helically around the inflator, the airbag, and the cover, and wherein attaching the tail to the at least one fastening stud to maintain the packaged condition of the airbag module comprises:
receiving the first fastening stud in the first opening on a first helical wrap of the tail round the inflator, the airbag, and the cover; and
receiving the second fastening stud in the second opening on a subsequent helical wrap of the tail round the inflator, the airbag, and the cover.

24. A method for packaging an airbag, the method comprising:
deflating, flattening, and rolling and/or folding an airbag to place the airbag in a stored condition;
providing a packaging wrap formed from a fabric sheet and comprising a cover and an elongated tail that extends from the cover, wherein the cover is configured to be wrapped or folded about the rolled and/or folded airbag to envelope and package the airbag in the stored condition, the tail being configured to be wrapped around the cover and the airbag packaged therein to secure the airbag packaged in the cover;
providing an inflator operatively connected to the airbag;
wrapping or folding the cover about the rolled and/or folded airbag and the inflator to envelope and package the airbag and inflator in the cover; and
wrapping the tail around the inflator, the cover, and the airbag packaged therein to secure the airbag packaged in the cover and to form a packaged airbag module,
wherein the inflator has at least one fastening stud for mounting the inflator to a vehicle, the method further comprising attaching the tail to the at least one fastening stud to maintain the packaged condition of the airbag module, and
wherein the cover comprises longitudinally extending upper and lower edge portions and first and second end portions at opposite ends of the upper and lower edge portions, and wherein wrapping or folding the cover about the rolled and/or folded airbag comprises:
folding or wrapping the lower edge portion about the rolled and/or folded airbag;
after folding or wrapping the lower edge portion about the rolled and/or folded airbag, attaching the lower edge portion to the at least one fastening stud;
folding the first end portion onto the rolled and/or folded airbag;
after folding the first end portion onto the rolled and/or folded airbag, attaching the first end portion to the at least one fastening stud;
folding or wrapping the upper edge portion about the rolled and/or folded airbag;
after folding or wrapping the upper edge portion about the rolled and/or folded airbag, attaching the upper edge portion to the at least one fastening stud;
folding the second end portion onto the rolled and/or folded airbag; and
after folding the second end portion onto the rolled and/or folded airbag, attaching the second end portion to the at least one fastening stud.

* * * * *